Feb. 24, 1925.  
W. L. MERRILL  
ELECTRIC HOT WATER HEATING SYSTEM  
Filed Nov. 17, 1922  
1,527,692
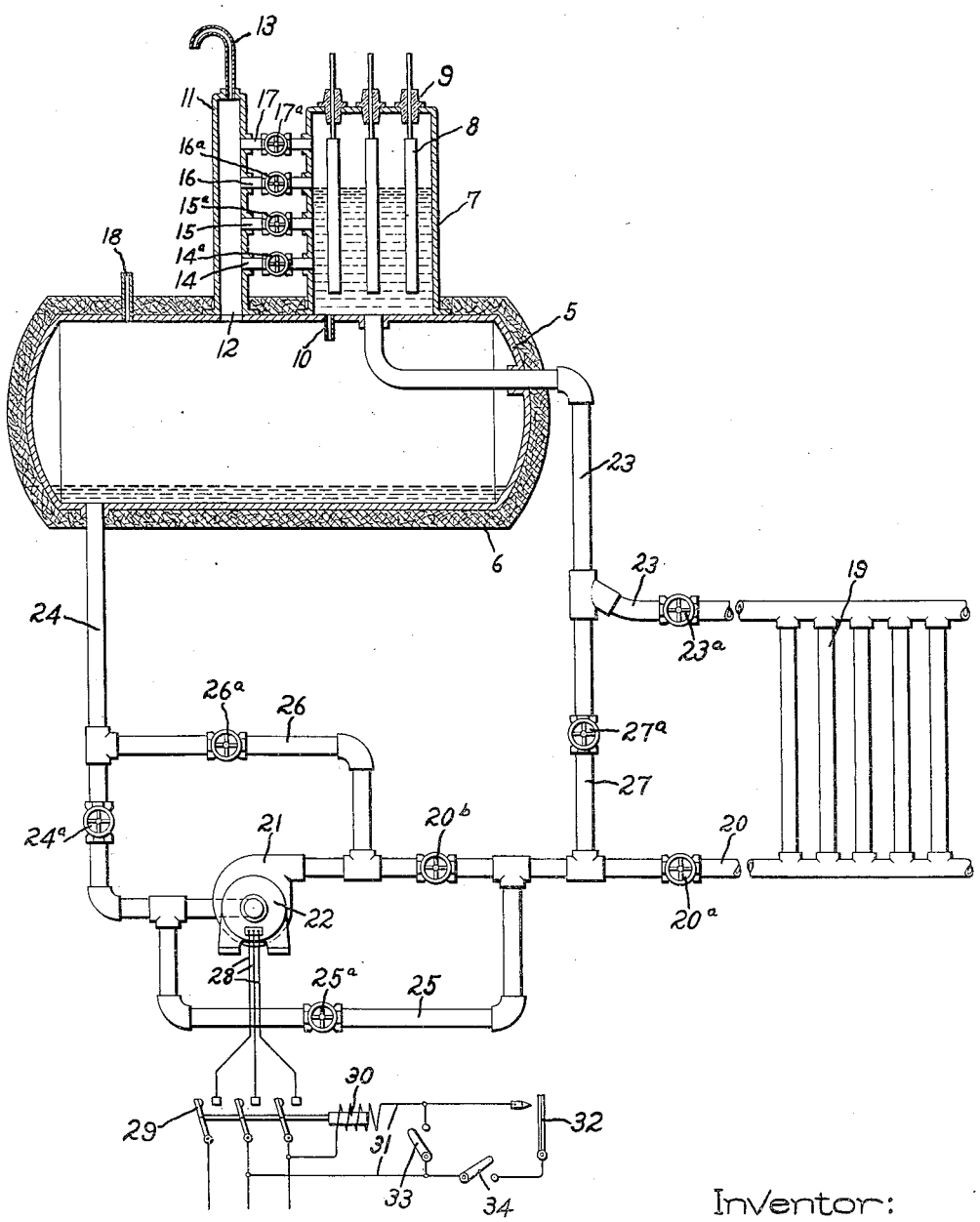
Inventor:  
Wilbur L. Merrill,  
by *Alexander D. Lunt*  
His Attorney.

Patented Feb. 24, 1925.

1,527,692

UNITED STATES PATENT OFFICE.

WILBUR L. MERRILL, OF SCHENECTADY, NEW YORK, ASSIGNOR TO GENERAL ELECTRIC COMPANY, A CORPORATION OF NEW YORK.

ELECTRIC HOT-WATER HEATING SYSTEM.

Application filed November 17, 1922. Serial No. 601,629.

*To all whom it may concern:*

Be it known that I, WILBUR L. MERRILL, a citizen of the United States, residing at Schenectady, in the county of Schenectady, State of New York, have invented certain new and useful Improvements in Electric Hot-Water Heating Systems, of which the following is a specification.

The present invention relates to hot water heating systems and has for its object to provide an improved system wherein the heat is furnished by an electric boiler, preferably of the electrode type.

For a consideration of what I believe to be novel and my invention, attention is directed to the accompanying description and the claims appended thereto.

In the drawing, the figure is a diagrammatic view partly in section of a hot water heating system embodying my invention.

Referring to the drawing, 5 indicates a hot water storage tank or drum covered with heat insulating material 6. Mounted above drum 5, and preferably directly on it, is the shell 7 of an electric heater or boiler. Projecting into shell 7 are electrodes 8, the same passing through suitable bushings 9 of insulating material. In the present instance three electrodes are shown adapting the heater or boiler for use with three-phase alternating current, but it will be understood that this is only by way of example and that any suitable electrode arrangement may be used. The electrodes may be connected to any suitable source of electrical energy (not shown) in the well understood manner. The bottom of the heater or boiler communicates with the interior of storage tank 5 through a drain pipe 10. Mounted on storage tank 5 adjacent shell 7 is a stand pipe 11 which at its lower end communicates with the interior of tank 5 through an opening 12. The upper end of stand pipe 11 is provided with an air vent 13. Stand pipe 11 is connected to the electric heater by a series of spaced pipes 14, 15, 16 and 17, each provided with a valve, 14ª, 15ª, 16ª and 17ª respectively. Any suitable number of pipes may be utilized, the four shown in the present instance being only by way of example. In shell 5 is a vent opening 18 for admitting and discharging air from the tank.

At 19 is indicated a hot water radiator or radiator system. It may be of any suitable extent and is located in the building or buildings to be heated. The admission end of the radiator is connected by a pipe 20 to the discharge side of a pump 21 which is shown as being driven by electric motor 22. The discharge side of radiator 19 is connected by a pipe 23 to the bottom of boiler shell 7. The suction side of pump 21 is connected by a pipe 24 to the bottom of tank 5. In pipe 20 is a valve 20ª; in pipe 23 is a valve 23ª and in pipe 24 is a valve 24ª. The admission pipe 20 is connected to the suction side of pump 21 by a bypass conduit 25 in which is a valve 25ª and conduit 24 is connected to the discharge side of pump 21 by a bypass conduit 26 in which is a valve 26ª. Conduit 26 is connected to pipe 24 between valve 24ª and the tank 5 so that in substance it connects the discharge side of pump 21 to tank 5. Pipes 20 and 23 are connected together by a short circuiting pipe 27 in which is a valve 27ª. Also in pipe 20, between the points where conduits 25 and 26 are connected to it is a valve 20ᵇ.

Motor 22 is connected by lead wires 28 to any suitable source of electrical energy. In lead wires 28 is a switch 29 which is biased to open position and is adapted to be closed by an electromagnet 30 connected in a circuit 31.

Electric circuit 31 is adapted to be closed by a thermostat 32 located in the building to be heated by radiator 19. When the thermostat is closed it effects the closing of switch 29, thereby starting the motor 22, while when it is open, the switch 29 will automatically open to stop the motor. At 33 is indicated a normally open hand switch by means of which motor 22 may be started independently of the thermostat, and at 34 is indicated a normally closed hand switch which may be opened to put the thermostat out of action.

In operation the valves 24ª, 20ᵇ, 20ª and 23ª are opened and valves 25ª, 26ª and 27ª are closed. When the thermostat 32 is closed thereby closing the circuit of motor 22, the motor operates pump 21 to circulate water from tank 5 through pipe 24, pump 21, pipe 20, the radiator system and pipe 23 to the bottom of electric boiler shell 7. The electrodes 8 being connected to a source of electrical energy, the water supplied to shell 7 will be heated due to electric current passing through it in the well understood manner. The water supplied to shell 7 overflows through one of the pipes 14, 15, 16 or 17 according to the positions of the valves therein. In the present instance valves 14ª and 15ª are assumed to be closed while valves 16ª and 17ª are open. Under these circumstances, the water pumped into the bottom of shell 7 overflows through the pipe 16 into stand pipe 11 from whence it falls into tank 5. In passing through the electric heater this water is heated so that the water running from stand pipe 11 into tank 5 is hot water. It will thus be seen that pump 21 takes hot water from tank 5, circulates it through the hot water radiator system and thence to the electric heater, where it is reheated and then flows back to tank 5.

When a room temperature reaches a value higher than that for which thermostat 32 is set, the thermostat opens, thereby stopping motor 22 and pump 21. The circulation of water through the hot water radiator system then ceases and the water in shell 7 will gradually flow through drain pipe 10 into tank 5. As is well understood, in connection with an electric heater of this type, the power input to the heater varies with the depth to which the electrodes are submerged and it follows therefore, that as the water gradually runs out of shell 7, the power input to the heater is gradually decreased and if all the water runs out, then the heater will be shut off. The heater is thus gradually taken off the line when pump 21 stops, thus avoiding sudden load changes. If now the thermostat 32 closes again, thus starting up motor 22, pump 21 will start circulating water from tank 5 through the radiator system to the heater and thence back to tank 5. This will immediately bring the heater or boiler back into action to heat the water.

The pipe connections 14, 15, 16 and 17 are provided so that the input to the heater may be regulated in accordance with the temperature to which it is desired to heat the water. When it is desired that the water be heated to but a low temperature, as for example, in only moderately cold weather, all the valves in these pipes may be opened. This means then that the maximum level in the electric heater is defined by the lowermost pipe 14 so that the water in passing through the heater will be heated to but a moderate temperature because the electrodes are submerged only a small amount. On the other hand, if valves 14ª, 15ª and 16ª are closed, then the depth of the water in the boiler will be defined by the pipe connection 17. This will give the maximum submergence of the electrodes and hence the maximum heat to the water and may be used when very hot water is desired as for example in very cold weather. For intermediate temperatures, intermediate pipes 15 and 16 may be used for the overflow. By this arrangement I am enabled to regulate the heater in a very simple manner and without disturbing the pump or the rate of circulation of the water.

In certain applications a condition is met with wherein the hot water heating system is used only a part of the time; for example, in certain factories the hot water heating system is required only at night, the heat from machinery and apparatus used serving to keep the factory warm during the day time, i. e., during working hours. To take care of this condition I provide means whereby all the water of the heating system may be stored in tank 5 so that its heat is not lost. It is for this purpose that the bypass pipes 25 and 26 are provided. When it is desired to store the water in tank 5 valves 24ª and 20ᵇ are closed and valves 25ª and 26ª are opened. Under these circumstances when the pump is operated, which may be effected by closing hand switch 33, the water will be drawn from the radiator system through pipe 20 and bypass pipe 25 to the suction side of the pump and thence by way of bypass pipe 26 and pipe 24 to tank 5. After all the water of the system has been pumped into tank 5, valve 26ª may be closed so as to keep it there. The vent opening 18 serves for the admission or discharge of air to and from tank 5 as the water level therein varies. When it is desired to again put the system into operation valve 25ª is closed and valves 24ª and 20ᵇ opened. If now the pump is started, water from tank 5 will be again circulated through the hot water radiator system 19 to the electric heater or boiler and thence back to tank 5 as already described.

Since tank 5 is covered with heat-insulting material, but little of the heat in the water will be lost during the time the water is stored. Tank 5 has a capacity such that it will conveniently store all the water of the system including that in boiler shell 7. This means of course, that when the water is stored in tank 5 the water in boiler shell 7 will be drained into the tank thus cutting off the electric boiler.

If the water stored in tank 5 becomes quite cold and it is desired to quickly heat the same, valves 20ª and 23ª may be closed and valve 27ª in short circuiting pipe 27 opened. This then permits the pump to circulate water from the tank directly to the electric heater and back to the tank again without the water passing through the radiator. By this means the water can be quickly brought to as high a temperature as desired after which valve 27ª is closed and valves 20ª and 23ª opened to permit a circulation of the water through the radiator system.

The purpose of pipes 14, 15, 16 and 17 and stand pipe 11 is to provide a means for defining the level of the water in the boiler and it will be understood that any other suitable means may be used for this purpose.

It will be seen that the system is a closed one so that the same water is circulated continuously. This means that the saline content of the water will remain fixed and hence the heater will not be disturbed due to variations in the saline content of the water. Sufficient water will be put in the system so there will be always a desired amount in the bottom of tank 5.

Thermostats in common use can be adjusted to operate within narrow temperature ranges and by having the thermostat control the pump directly a quick response to temperature changes can be obtained. This arrangement provides a very simple control which requires no temperature compensating devices and no mechanism except the switch or switches for the motor circuit.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In an electric hot water heating system, the combination of a storage tank, an electric water heater, a radiator having its admission side connected to the tank and its discharge side connected to the heater, a conduit connecting the heater to the tank, a pump for circulating water through the system, and means for regulating the electric water heater in accordance with the requirements of the heating system.

2. In an electric hot water heating system, the combination of a storage tank, an electric water heater, a radiator having its admission side connected to the tank and its discharge side connected to the heater, a conduit connecting the heater to the tank, a pump connected in the system for circulating water therethrough, means for regulating the electric water heater in accordance with the requirements of the heating system, and means for reversing the pump connections whereby the water in the system may be pumped into the tank.

3. In an electric hot water heating system, the combination of a storage tank, an electric water heater of the electrode type, an overflow conduit connecting the water heater to the tank for defining the level of water in the heater, a drain conduit connecting the heater to the tank, a radiator, and means for circulating water from the tank through the radiator to the heater.

4. In an electric hot water heating system, the combination of a storage tank, an electric water heater of the electrode type, a plurality of vertically spaced overflow conduits connecting the water heater to the tank, for defining the level of water in the heater, a radiator, and means for circulating water from the tank through the radiator to the heater.

5. In an electric hot water heating system, the combination of a storage tank, an electric water heater of the electrode type, a plurality of vertically spaced overflow conduits connecting the water heater to the tank for defining the level of the water in the heater, a radiator, a pump having its suction side connected to the tank and its discharge side connected to the radiator, a conduit connecting the radiator to the heater, and means for reversing the pump connections whereby the water in the system may be pumped into the tank.

6. In an electric hot water heating system, the combination of a storage tank, an electric water heater, a radiator having its admission side connected to the tank and its discharge side connected to the heater, a conduit connecting the heater to the tank, a pump for circulating water through the system, and a conduit for short circuiting the radiator whereby water may be circulated from the tank directly to the heater and back to the tank to quickly heat up the contents of the tank.

7. In an electric hot water heating system, a storage tank, a heater shell mounted above it, electrodes in the shell, overflow conduit means connecting the shell to the tank for defining the level of water in the shell, a drain conduit which connects the lower end of the shell to the tank, a radiator, a pump for circulating water from the tank through the radiator to the heater shell and temperature responsive means controlling said pump.

8. In an electric hot water heating system, a storage tank, an electric water heater, a radiator, conduits connecting the radiator to the storage tank and the heater, conduit means connecting the heater to the storage tank, a pump for circulating water through the system, a motor for driving the pump, and thermostatically controlled means for starting and stopping the motor.

9. In an electric hot water system, the combination of a storage tank for holding hot water having a capacity such that it will hold all the water used in the system, an electric boiler, means for conveying water from the storage tank to the heater and back to the storage tank again for heating the water in the tank, and a hot water-consuming system connected with said storage tank.

In witness whereof, I have hereunto set my hand this 16th day of November, 1922.

WILBUR L. MERRILL.